April 11, 1967 N. I. MATSON 3,312,991
DEVICE FOR WASHING TIRES
Filed March 24, 1964 2 Sheets-Sheet 1
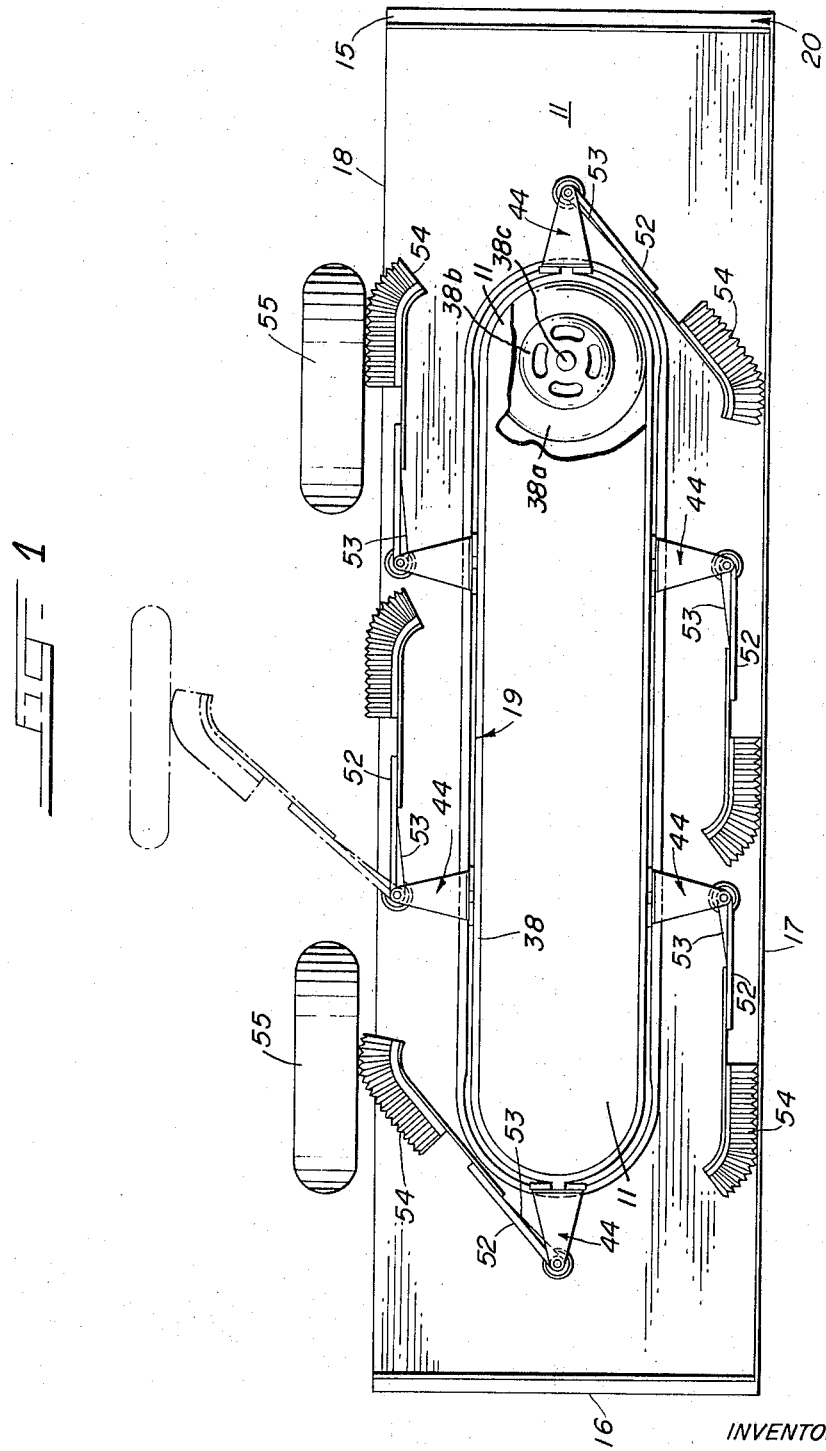
INVENTOR
NILS I. MATSON
BY John F. Brezina
ATTY.

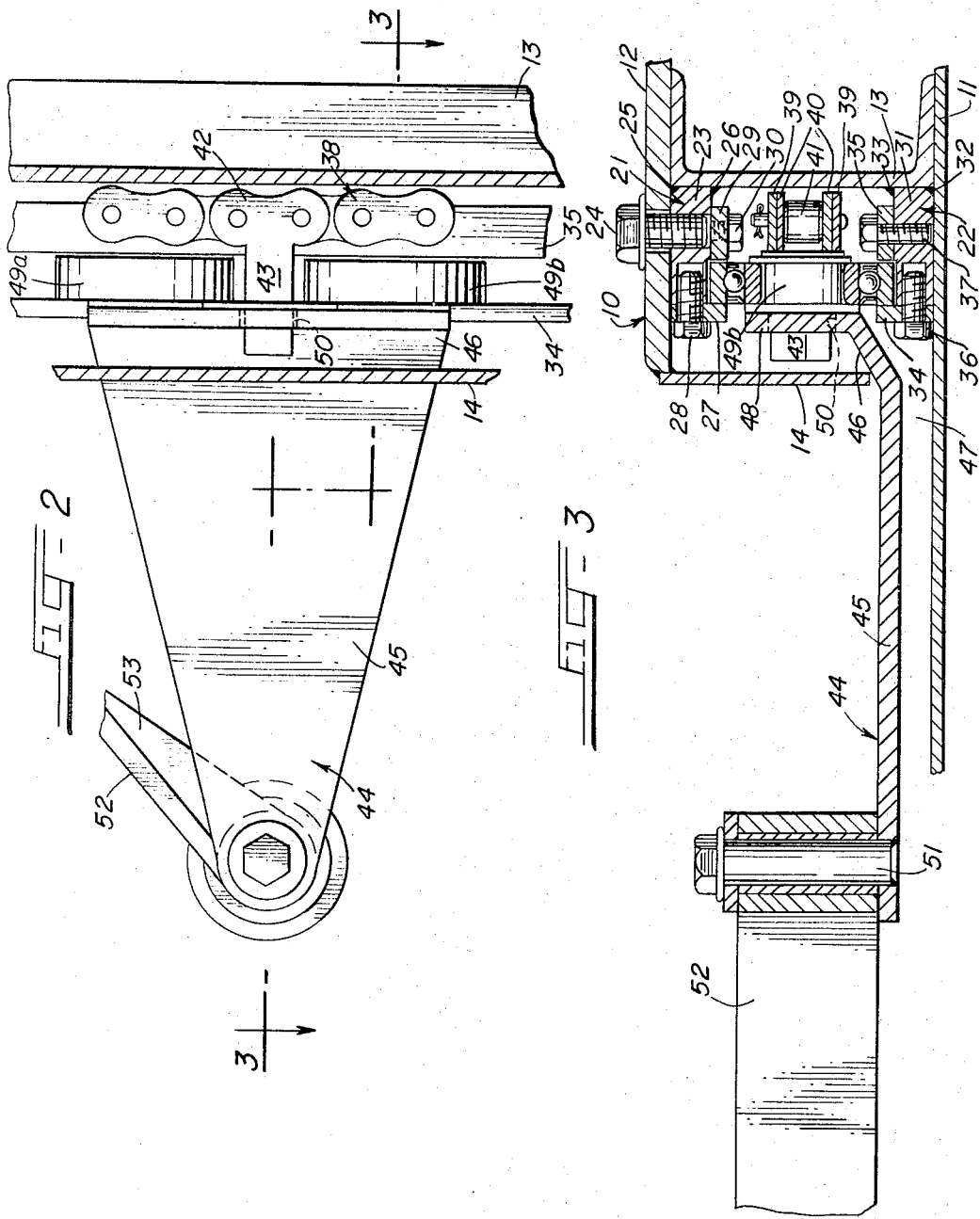

United States Patent Office 3,312,991
Patented Apr. 11, 1967

3,312,991
DEVICE FOR WASHING TIRES
Nils I. Matson, 22 N. Cowley Road,
Riverside, Ill. 60546
Filed Mar. 24, 1964, Ser. No. 354,215
5 Claims. (Cl. 15—21)

The instant invention relates to means for automatically washing vehicle tires. Particularly the invention relates to an apparatus which employs a conveyor that carries brushes into engagement with tires being moved in a predetermined path.

The invention is especially adapted for use in automatic car washing establishments. In such establishments, tire washing is considered one of the most expensive and troublesome parts of car washing operations.

Many useful prior devices have been conceived and are in use for tire washing; and such prior devices have somewhat reduced tire washing costs when compared with manual procedures. Notwithstanding the advances in the art provided by prior devices, tire washing employing such prior devices nevertheless remains inordinately costly because of the expensive, complex and costly to repair equipment required.

A conventional or customarily employed prior device comprises a bed in the floor of the car wash building in which the device is situate. The bed is composed of a plurality of rollers adapted to spin tires rapidly. As each vehicle is advanced in the washing line, one of its tires will engage the bed and the spinning rollers will rotate the thus engaged tire. Additionally, the bed will move along a track for a given distance with the tire. While the tire is thus spun and as the rollers are advancing, a brush, which is a part of the tire washing mechanism engages the spinning side surface of the advancing tire. At the position that the track on which the roller bed advances terminates, the tire moves from the bed. The bed then is impelled quickly down stream along the same path or track on which it moved upstream to engage the next oncoming tire. Such next oncoming tire may be the rear tire of the automobile the front tire of which has been previously washed, or it may be the front tire of the next oncoming vehicle that is to be washed after the rear tire of the previous vehicle has been washed.

The mechanisms required for such prior devices are exceedingly costly and comprise many and complex components, the sequential operation of which is highly integrated. Accordingly, maintenance is costly and loss of revenue during breakdown is frequent when compared with the same category of costs occurring when employing the invention which is the subject hereof.

It is an object of the invention to provide a device which comprises an endless conveyor to which there is secured a plurality of extensible brush-bearing members, and in which the brushes are urged toward an extended, tire engaging position while being driven in a direction opposite to the movement of a line of automobiles whereby successive tires engaged by the extended brushes and washed. Additionally, means are also provided for restraining the brushes from extension during the remainder of the circuit whereby physical dimension of the equipment may be minimized.

Other and further objects of the invention will become apparent from the following description and appended claims, reference being had to the accompanying drawings and the numerals of reference thereon.

On the drawings:

FIG. 1 is a top plan view of one embodiment of the invention with the top of the track housing removed and showing the conveyor and connected parts.

FIG. 2 is an enlarged detailed view looking at a fragment of the conveyor from above.

FIG. 3 is a sectional view taken on the line 3—3 of FIG. 2 and looking in the direction of the arrows.

Referring now more particularly to the drawings, the device comprises a track housing generally designated by the numeral 10, as illustrated in FIG. 2. The housing is preferably of elongated oval configuration when viewed from the top, and conforms to track 19 to be hereinafter described and clearly seen in FIG. 1. The housing is secured on a portion of a large base or plate 11. A cover plate 12, which is part of the housing, is vertically spaced a short distance above the base plate 11 and said cover extends in an endless path conforming to track 19 which will hereinafter be described. The spacing of the plate 12 and the base 11 is maintained by a channel member 13 which extends in a circuit inwardly of the track 19 and which is rigidly secured to base 11 and plate 12 as illustrated in FIGS. 2 and 3.

The casing 10 has an outer or front plate 14 which is seen in FIGS. 2 and 3. Plate 14 extends in a circuit outwardly of the track 19; and said front plate 14 is rigidly secured along its upper end to the cover or upper plate 12 as illustrated in FIG. 2.

Track housing 19, thus defined, is maintained and disposed in an outer rigid structure or housing generally designated by numeral 20 and clearly seen in FIG. 1. Housing 20 is defined by base 11 and a pair of side walls 15 and 16 which are parallel to each other. A back wall 17 which is perpendicular to side walls 15 and 16 is secured thereto at its opposite sides, as illustrated in FIG. 1. Walls 15, 16 and 17 are perpendicular and at their lower ends rigidly secured to base 11.

The foregoing construction provides an elongated opening 18 in the housing which extends parallel to inner or back wall 17, as illustrated in FIG. 1.

The track housing 10 has disposed therein an oval or endless roller track generally designated by the numeral 19, as illustrated in FIG. 1. As illustrated in FIG. 3, track 19 comprises an upper track section generally designated by the numeral 21 and a lower track section generally designated by the numeral 22. The upper track section 21 comprises an upper rim bearing member 23 which is secured to the upper housing plate 12 by bolts 24, only one of which is seen in FIG. 2, and by welding to the upper track plate 12 and the inner trough 13 as designated at 25 and 26. An outer bearing flange 27 which extends longitudinally of the track 19 in endless path is rigidly secured by fasteners such as bolts and the like 28 to the outer surface of the upper rim bearing member. An inner bearing flange 29 is disposed longitudinally of the track 19 and is rigidly secured to the upper rim bearing member by fasteners such as bolts or the like 30, as illustrated in FIG. 3.

The lower track section 22 comprises a lower rim bearing member 31. The lower rim bearing member 31 is spaced from the upper rim bearing member 23 and extends parallel thereto in an endless path. The lower rim bearing member 31 is secured to the base plate 11 and the channel member 13 by means of welding, spots of which are shown at 32 and 33 in FIG. 3. The lower track section 22 also comprises an outer bearing flange 34 and inner flange 35 which extend parallel to each other in an endless path about the track 19. Flanges 34 and 35 are rigidly secured to the lower rim bearing member 31 by fasteners such as bolts or the like 36 and 37 respectively only one of each of which is shown in FIG. 3.

A conveyor generally designated as 38 and disposed within the track housing 10 adjacent track 19 extends in an endless circuit. Said conveyor 38 may comprise an endless rollably mounted belt or a plurality of pivotally connected metal links. In the embodiment herein illustrated, the conveyor 38 comprises a plurality of connected together links. As illustrated in FIG. 3, the illustrated links each comprise a pair of spaced apart outer plates 39, and inner bearing plates 40 separated by a bearing or barrel tie 41.

As illustrated in FIG. 2, a tie, lock, lug or boss 43 is rigidly secured to or made integral with selected, non-adjacent, and spaced apart links 42. The ties 43 extend inwardly from their respective links 42 for a reason to become hereafter apparent.

As illustrated in FIG. 1, a plurality of brackets 44 are disposed about the track 19 longitudinally thereof and in spaced apart relationship with respect to each other. As illustrated in FIGS. 2 and 3, each bracket 44 comprises a rigid outwardly extending arm portion 45 which is disposed outwardly from the track housing 10, and an inner portion 46 which extends into the track housing 10 through a slot 47. The slot 47 is formed by spacing the lower end of outer track housing member 14 from base 11, as illustrated in FIG. 3.

An inner and upwardly extending portion 48 of each bracket 44 has rigidly secured thereto or made integral therewith or carried thereby a carrier comprising, in this embodiment of the invention, a pair of ball bearing wheels 49a and 49b, as illustrated in FIG. 3. A lock or tie 43 is associated with each carrier comprising a related pair of wheels 49a and 49b and extends therebetween through a slot or aperture 50 in respective arm or bracket portion 48, as illustrated in FIGS. 2 and 3.

It is appreciated of course that the conveyor 38 is preferably automatically power driven by means illustrative of power driven means well known in the art is the electric motor 38b shown in FIG. 1 mounted on one end portion of plate 11, and having a depending shaft 38c, and on which said shaft is suitably secured a wheel or pulley 38a which is in such a position that its annular periphery engages and selectively drives the conveyor 38. As the conveyor is driven, the wheels 49a and 49b of each carrier ride in and are carried along the track 19, as illustrated in the drawings. It is of course appreciated that the ties 43 transmit the force of the conveyor to the brackets 44, respectively, and their associated carriers.

A pivot pin 51 carried in the outer end portion of each bracket 44 provides the means for rotating a respective spring pressed arm 52, one of which is carried by each bracket 44. By suitable extension means such as a compression or leaf spring 53, suitably connected to the arm 52 in a manner well known to those in the art, each arm 52 is urged toward an extended position or outwardly from the conveyor 19. A substantially extreme extension is shown in the dotted line of FIG. 1. Rigidly secured to an outer end portion of each arm 52 and extending outwardly therefrom is a brush carrying member 54, as illustrated in FIG. 1.

Now the device operates as follows: As the conveyor is driven in its circuit, each arm 44 and its associated carrier is carried along the track 19. When the brushes 54 are carried past the opening 18, the extending force of springs 52 urge the brushes though the opening 18 in housing 20.

In normal operation vehicles having tires 55 will be moving past opening 18 in a straight line in one direction which is herein referred to as upstream. In the illustration in the drawing upstream would be to the right with respect to FIG. 1. The brushes 54 when they are opposite the opening 18, are carried down stream or to the left with respect of FIG. 1, by reason of the counter clockwise rotation of conveyor 13 with respect to FIG. 1. The tires 55 rotate as the vehicles move along the line; and said tires are engaged by successive brushes whose outward extension is limited by tires 55.

Because of the foregoing construction tires on narrow vehicles will be accommodated in a car wash line, as well as tires on wider vehicles. In FIG. 1 the dotted line position designates a narrower vehicle.

It is appreciated of course that a pair of conveyors will be used in normal operation. Thus tires on each side of vehicles will be washed. It is also observed that the speed of the conveyor and the spacing of the brackets 44 and their respective brushes as well as the length of the track may be optionally varied according to, for example, the speed of rotation of the tires 55, and according to other factors which will be apparent to those skilled in the art.

As many changes or substitutions could be made in the above described construction and process and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. An automobile tire and wheel washing device or the like comprising means providing a movably mounted endless conveyor;

means for movably mounting said conveyor in an endless path, said conveyor being adapted to be driven by power means;

a plurality of arms pivotally and springably connected to said conveyor in longitudinally spaced apart relation and adapted to be pivotally extended outwardly from said conveyor;

a plurality of brushes connected to the extendable portions of said arms respectively;

and means for intermittently extending and for retracting said arms away from and toward said conveyor; said brushes, when extended, being adapted to engage automobile tires and wheels, said means for extending said arms including springs connected to said conveyor and engaging and normally pressing said arms respectively outwardly from said conveyor.

2. An automobile tire washing device and the like comprising means providing an endless track; a driven conveyor; a plurality of brush holding brackets carried along said track by said conveyor; brush members connected to said brackets, and means for extending said brushes toward and away from said track.

3. An automobile tire washing device and the like comprising means providing an endless track; a conveyor mounted adjacent said track; means driving said conveyor; a plurality of brackets secured to said conveyor and driven thereby along said track, said brackets disposed longitudinally of said conveyor in spaced apart relation; an arm connected to each bracket; a brush mounted on each arm; spring means extending said brushes outwardly from said brackets against automobile wheels, and means including a housing for rotating said arms from extended positions.

4. An automobile tire washing device and the like comprising a housing having an opening; an endless track mounted in said housing; a conveyor mounted adjacent said track; means driving said conveyor; a plurality of brackets connected to said conveyor and driven along said track; an arm pivotally connected to each bracket; a brush mounted on each arm; spring means urging each arm into extended position through said opening, the engagement of said brushes with said housing pivoting and holding said arms against the action of said spring means.

5. An automobile tire washing device and the like comprising an elongated rigid structure providing a housing, one side of said housing having an elongated opening extending longitudinally of said housing; an endless conveyor disposed in said housing; an oval track disposed in said housing; a plurality of conveyor driven carriers mounted on said track; a bracket connected to each carrier; an elongated arm pivoted on each bracket; a brush secured on each arm; a spring connected to each arm and adapted to drive same with a respective brush through said opening, and means for driving said conveyor whereby said extended brushes are engaged successively by said housing and pivoted into retracted position and so held by said housing until carried to alignment with said opening.

References Cited by the Examiner
UNITED STATES PATENTS
2,000,779   5/1935   Miller _____ 15—3.16
FOREIGN PATENTS
911,656   11/1962   Great Britain.

CHARLES A. WILLMUTH, *Primary Examiner.*
E. L. ROBERTS, *Assistant Examiner.*